Feb. 19, 1935.  F. T. KREIN  1,991,617
METHOD AND APPARATUS FOR APPLYING INSIGNIA TO CONFECTION
Filed Dec. 30, 1932  4 Sheets-Sheet 1
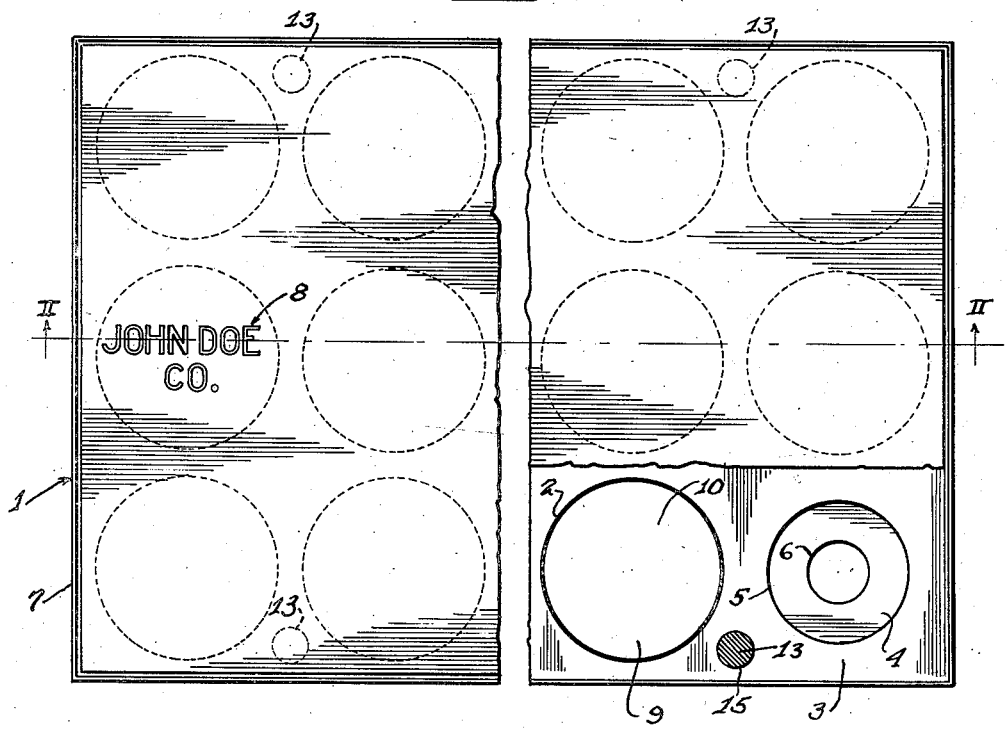
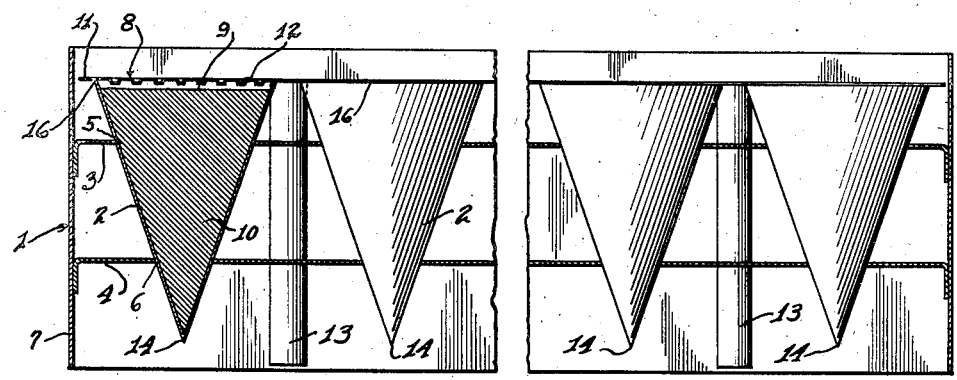
Inventor
Frederick Thomas Krein.

Feb. 19, 1935. F. T. KREIN 1,991,617
METHOD AND APPARATUS FOR APPLYING INSIGNIA TO CONFECTION
Filed Dec. 30, 1932 4 Sheets-Sheet 2
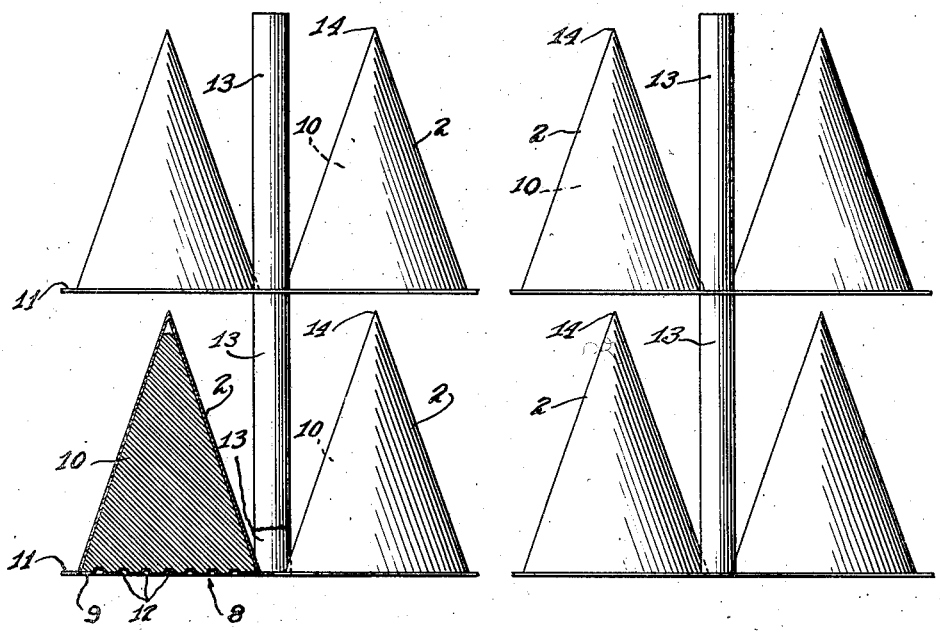
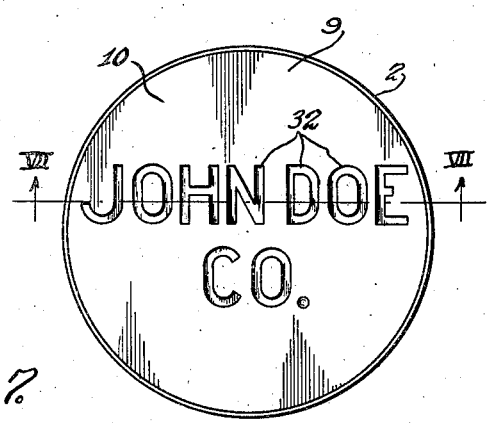
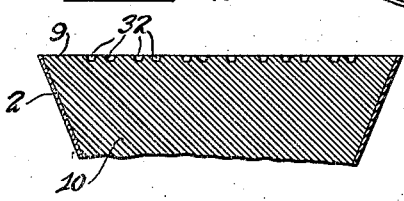
Frederick Thomas Krein.

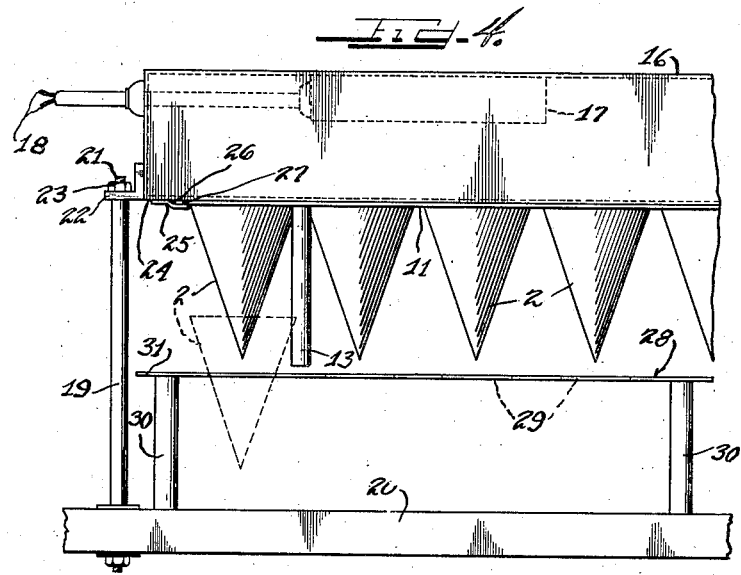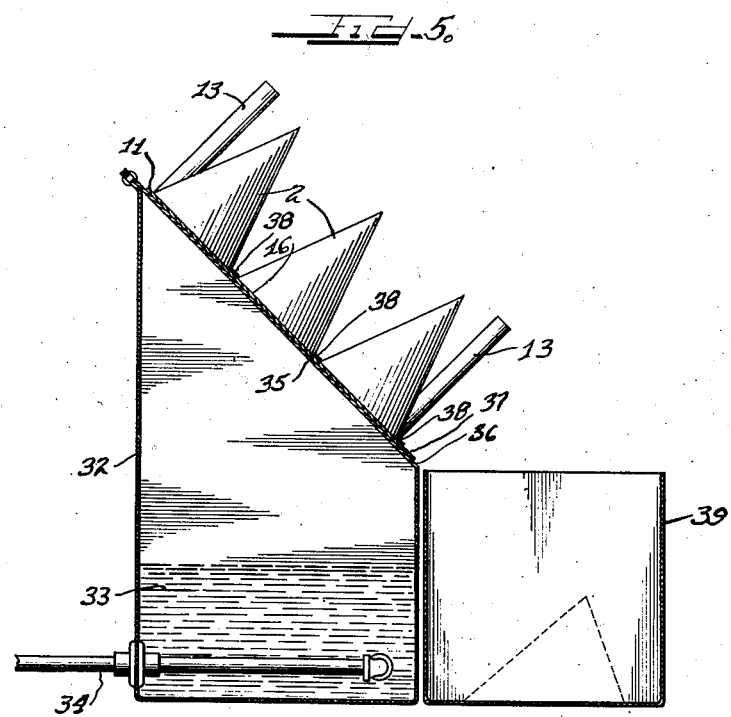

Feb. 19, 1935. F. T. KREIN 1,991,617
METHOD AND APPARATUS FOR APPLYING INSIGNIA TO CONFECTION
Filed Dec. 30, 1932 4 Sheets-Sheet 4
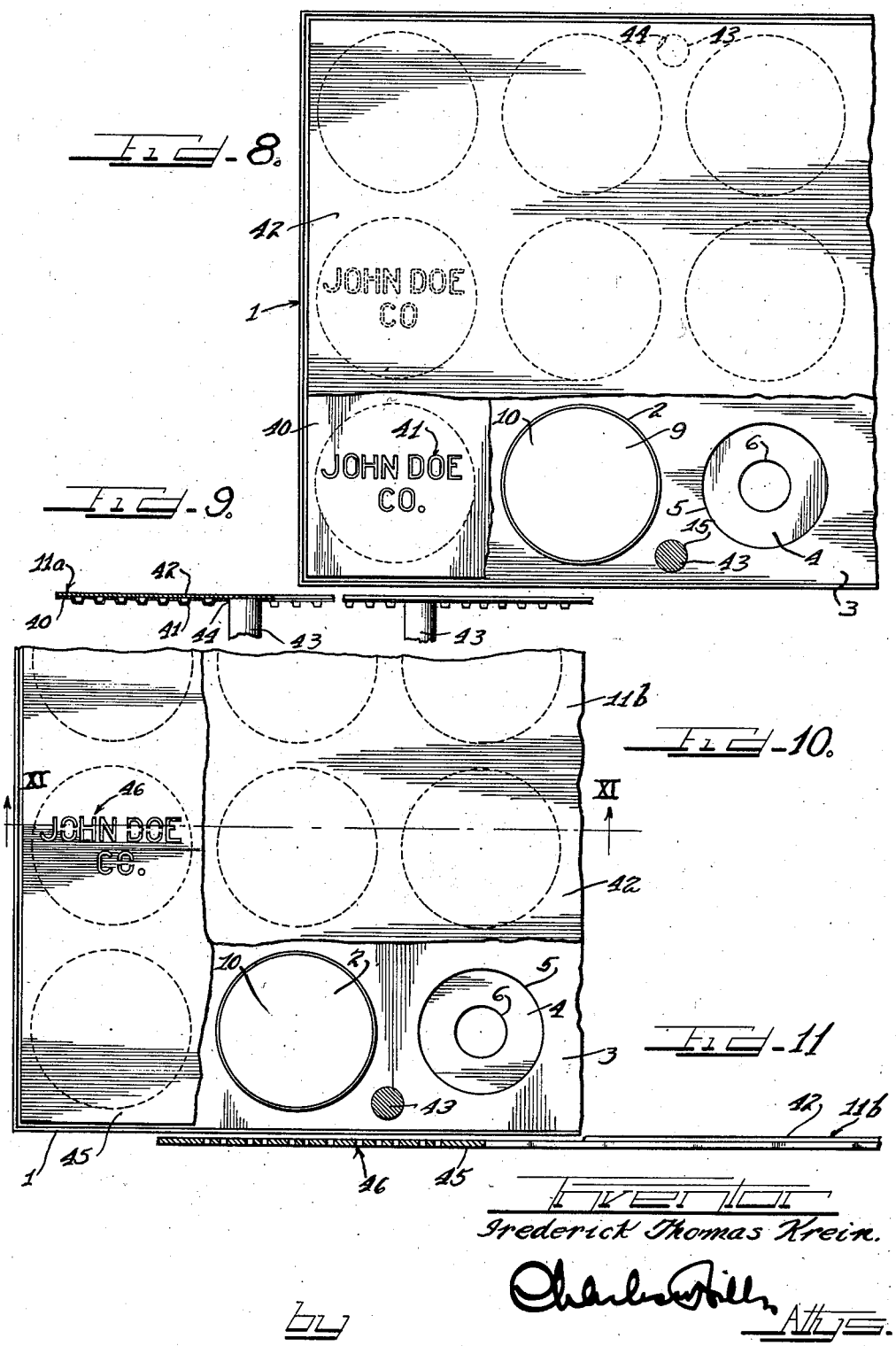
Frederick Thomas Krein.

Patented Feb. 19, 1935

1,991,617

UNITED STATES PATENT OFFICE 1,991,617

METHOD AND APPARATUS FOR APPLYING INSIGNIA TO CONFECTION

Frederick Thomas Krein, Park Ridge, Ill., assignor to Vortex Cup Company, Chicago, Ill., a corporation of Delaware Application December 30, 1932, Serial No. 649,575

15 Claims. (Cl. 107—54)

This invention has to do with the marking or printing of frozen edibles such as ice cream, sherbet, frozen syrup, and the like.

The aim of this invention is to provide a method and an apparatus for applying insignia to confection as well as to provide a novel article of manufacture in the form of a properly identified frozen confection.

It is an object of this invention to provide a simple, novel and commercially practical process of printing in intaglio or by embossing or in cameo, frozen edibles such as ice cream, sherbet, syrup and the like.

It is another object of the invention to print in intaglio or relief a design or marking in an edible such as ice cream or the like during the process of freezing the same from a substantially semi-solid to a substantially solid condition.

It is a still further object of the invention to print a design or the like upon the exposed surface of ice cream or the like during the process of freezing the same from a substantially semi-solid to a substantially solid condition, while said ice cream is disposed in individual packs or containers.

The invention contemplates as a further object the provision of a novel method for separating the hardened ice cream or the like from the instrumentalities employed in printing the same.

It is a further object of the invention to provide a novel method utilizing gravity in effecting a separation of the hardened ice cream or the like from the means employed in the printing thereof.

Another object of the invention consists in the provision of a method employing heat for effecting a separation of the hardened edible material such as ice cream from a means for printing the same.

The invention contemplates as a further object the provision of an apparatus for carrying out the process or processes embodying the invention.

In carrying out the invention in accordance with one process, sufficient edible material such as ice cream is deposited in a semi-solid state into a container such as a paper cup in which the ice cream is to be delivered to the ultimate consumer, and a plate bearing the desired name or design to be printed in the edible formed in intaglio or relief is placed over the cup so as to form a cover therefor. With the plate in covering relation to the cup containing the edible, the cup is turned upside-down so that it rests on the cover, whereupon it is subjected to a freezing or hardening process with the design embedded in the material. After the hardening process is completed, the plate adheres firmly to the edible material, but is released therefrom by the application of heat to the free side of the plate, the parts being so placed that gravity is made effective in causing the cups and edible material therein to be separated from the plate without marring the design formed in the edible material.

In accordance with one form of the invention, the apparatus embodies a tray formed to support a plurality of paper cups in a position to receive individual deposits of the semi-solid ice cream or the like. A plate having a number of designs or names corresponding to the number of cups and correspondingly spaced is employed to cover the cups after the material is deposited therein, means being employed in conjunction with the plate to properly position the same relative to the cups. Spacing means cooperating with the plate makes possible the stacking of the plates bottom side up, in which condition they support the associated cups when the latter are removed from the tray. The printing plate may consist of a single piece of metal, for example, or a sheet of material such as parchment or thin bond paper and a cooperating preferably flat plate made of such material as metal cooperating therewith.

The heating apparatus, in accordance with one form of the invention, affords a support for the plate with the cups right side up and supported merely by reason of the adhesion between the frozen edible and said plate. The free side of the plate is subjected to heat and the cups containing the edible material fall away from the plate when the weight of each cup and contained material exceeds the adhesion between the material and the plate. A suitable receptacle for the falling cups is provided.

In accordance with a further form of the invention, the apparatus provides an inclined supporting wall on which the printing plate is placed, and said wall is subjected to heat which is transferred to said plate. Means is provided adjacent the lowermost portion of the base of each cup to prevent the cup's sliding down the plate when the heat reduces the adhesion between the ice cream and the plate sufficiently to release the same. The inclination of the plate is such that the center of gravity of each cup lies preferably beyond the point where the obstruction engages the base of the cup, so that said obstruction serves as a pivot point about which the cup topples when said adhesion is sufficiently reduced by heat. A suitable bin or container is provided to receive the cups as they topple away from the plate.

Further objects and advantages of the invention will appear as the description proceeds.

The invention (in preferred forms) is illustrated in the accompanying drawings and hereinafter more fully described.

On the drawings:

Figure 1 is a fragmentary plan view of a tray for supporting cups while the semi-solid edible material is deposited therein, together with one form of printing device for the edilbe material, a portion of the device and one of the cups being removed to show details of construction.

Figure 2 is a fragmentary sectional view taken approximately in the plane designated by the line II—II in Figure 1, certain parts being shown in elevation.

Figure 3 is a fragmentary view, partly in section and partly in elevation, showing the printing device in the performance of its additional role as a support for the cups containing the edible material and for supporting additional devices and associated cups in stacked relation.

Figure 4 is a fragmentary elevational view showing an apparatus constructed in accordance with one form of the invention, for heating the printing device to effect a release of the cups therefrom, together with a means for receiving the released cups.

Figure 5 is a sectional view of a modification of the apparatus appearing in Figure 4.

Figure 6 is an enlarged plan view of a cup of frozen edible ready for consumption and showing the design formed in accordance with the present invention in the surface of the edible.

Figure 7 is a fragmentary sectional view taken approximately as designated by the line VII—VII in Figure 6.

Figure 8 is a fragmentary plan view, partly in section, similar to Figure 1 but showing a modified printing device construction.

Figure 9 is a fragmentary view, partly in section, and partly in elevation, showing details of the modified printing device construction appearing in Figure 8.

Figure 10 is a view similar to Figure 8 but showing a still further modified printing device construction.

Figure 11 is a view similar to Figure 9 but showing the modified printing device construction which appears in the plan view of Figure 10.

Referring now more particularly to the drawings, the invention contemplates the provision of a tray 1 which may be of any suitable material such as metal and may embody any suitable construction to afford a proper support for the cups or containers 2. The cups 2 may be of any suitable shape, and it will of course be appreciated that the construction of the tray 1 will correspond so as to properly support the cups. The cups 2 are shown herein for illustrative purposes only as in the shape of cones, and the tray 1 is provided with substantially horizontally spaced shelves 3 and 4 provided with openings of different sizes as shown at 5 and 6, respectively, coaxially arranged and of a size to properly receive and engage spaced circumferential portions of the cups 2. The means for properly supporting the cups 2 could of course comprise a member or members affording a plurality of cone-shaped sockets. The shelves 3 and 4 may be secured to the wall 7 of the tray 1 in any suitable manner as by soldering, rivets, nuts and bolts, or the like.

For the purpose of forming a design, name or the like 8 in the outer surface 9 of the edible 10 to be frozen or hardened, in accordance with one form of the invention a preferably stiff plate 11 of any suitable material in which the design is formed is employed. The plate 11 may be formed of sheet metal, for example, or of fiber or hard rubber if desired. The design or lettering 8 in the plate 11 is shown in Figures 2 and 6 as consisting of portions of the plate which are embossed at 12, and in the formation of the same design in the outer surface 9 of the edible material 10, the lettering is so positioned with respect to the surface 9 that the projecting surfaces of said letters face said surface 9. The plate 11 is preferably formed with as many designs 8 as there are cups in the tray 1, or as the tray 1 will hold, said designs being spaced in accordance with the spacing of the cups and arranged to be positioned, when the plate 1 itself is properly positioned, in covering relation to the cups as shown. The character of the design 8 may be varied as desired, and that appearing in the drawings and consisting of the expression "John Doe Co." is included merely for the purpose of illustration. This particular design is illustrated in Figure 1 as arranged over only one cup, but it will of course be understood that each of the cups may be covered by a like design.

The plate 11 is provided with pins 13 in a sufficient number to support the plate 11 in stable equilibrium. While the number of pins 13 may be varied from three up, four are suitable for the purposes of this invention. The pins or legs 13 are secured to the plate 11 by soldering or by riveting or in other suitable manner, and are of substantially equal length and of greater length than the cups 2 so that when the plate 11 is positioned in covering relation to the cups 2 as shown in Figure 2, the legs 13 extend beyond the apices 14 of the cups. At this point it will be observed that it is desirable that the plate 11 be of sufficiently strong material to afford a fairly rigid connection between the same and the pins 13. While the pins 13 are shown to be solid, they could, of course, be made tubular without departing from the principles of the present invention.

The tray 1 is provided with openings 15 arranged in the shelves 3 and 4, respectively, in accordance with the arrangement of the pins 13, for receiving the latter to thereby properly position the plate 11 over the cups 2 so that, for each cup, there is a design 8 in covering relation thereto as shown in Figure 2.

The tray 1 with its empty cups 2 and without the cover 11 is first charged with the semi-liquid food such as ice cream, to a level preferably slightly less than full, substantially as shown at 9 in Figure 2. The purpose of this is to allow for expansion in freezing or hardening and also to eliminate seepage or spilling of the contents. After the cups in the tray 1 receive the charge of the semi-liquid ice cream or the like, the plate 11 is placed thereover, with the pins 13 fitting in the openings 15 in the tray. The tray 1 is thereupon inverted with the plate 11 held against the rims 16 of the cups 2, and then the tray 1 is removed and the plate 11, with its pins extending upward, positioned on a substantially horizontal support such as a conveyor (not shown). One such plate 11 will be positioned in contact with the conveyor, and additional plates together with the charged cups supported thereby stacked over said one plate, each additional plate being supported by the upstanding pins 13 of the next lower plate 11 as shown in Figure 3. With this construction, it will be evident that a large number of charged cups 2 may be supported compactly and without danger of disturbance. The material 10 is preferably in a substantially semi-liquid or plastic condition when charged into the cups 2 so that its viscosity is so high as to preclude its seepage from the cups 2 between the same and the cover 11. The stack of plates 11 and associated charged cups 2 is placed in a hardening and freezing or refrigerating compartment where it is subjected to a low temperature, such as that which may be afforded by the employment of dry ice or carbon dioxide snow, until the ice cream or the like 10 is relatively hard, that is, has a consistency such that it will retain its shape and will not flow. Thus it would be preferable to impart to the food 10 a substantially uniform temperature which is substantially below the temperature at which the material begins to flow or melt, so that said material will retain its shape for a substantial period of time after it is removed from the hardening or refrigerating compartment without danger of its melting.

As the food material 10 hardens, the lettering 8 acquires a greater and greater permanency of shape and is formed as an engraving in the surface 9 of the material 10. During the hardening or freezing of the material 10, moreover, the portion of the plate 11 in contact with the surface 9 of said material becomes more and more securely attached to said surface so that at the completion of the hardening or freezing process, the plate 11 and charged cups carried thereby constitute substantially an integral unit.

With a view to effecting a separation between the name plate 11 and the associated cups 2 containing the frozen food material 10, the invention contemplates the provision of an apparatus which is shown fragmentarily in Figure 4. This apparatus comprises a compartment 16 provided with a heating unit 17 which may receive heat energy from a source of electricity to which the wires 18 lead. It is well within the province of the invention, however, to make use of a different source of heat supply such as gas, steam or the like. The compartment 16 is supported by any suitable means such as standards 19 extending upwardly from a base 20, said standards being connected to the compartment 16 in any suitable manner, as shown in Figure 4 wherein the standards 19 are reduced and threaded at 21 providing shoulders upon which the brackets 22 rest. Nuts 23 applied to the threaded ends 21 of the standards 19 serve to hold the compartment 16 firmly on the standards 19.

Guide means of any suitable construction such as strips extending along opposite margins of the bottom 24 of the compartment 16 are employed for positioning the plate 11. One such strip is shown at 25 and forms with said bottom 24 of the compartment 16 a recess extending in substantial parallelism with the adjacent margin of the wall as shown at 26, for receiving the marginal portions 27 of the plate 11. The strips 25 thus serve to properly position and support the opposite margins 27 of the plate 11 and to hold substantially the entire upper surface of the plate 11 in substantial contact with the bottom wall 24 of the compartment 16. A tray 28 formed with holes 29 arranged in accordance with the arrangement of cups 2 may be supported by the base 20 by legs 30 preferably attached to the plate 31 of the tray 28 in any suitable manner as by solder, rivets or the like. When the tray 28 is positioned on the base 20 so that its holes 29 are substantially coaxial with the various cups 2, the cups 2 will gravitate into said holes upon separation of the cups 2 from the plate 11. Such separation is effected by a transfer of heat from the compartment 16 to the plate 11 until the adhesion of the plate 11 to the surface 9 of the food 10 is reduced to such an extent that it is overcome by gravity of the cups 2 and the food 10 contained thereby. The tray 28 is thereupon removed with the cups 2, which are then ready for shipment or consumption, as the case may be.

While a tray 28 is herein disclosed for catching the cups 2 as they are released from the name plate 11, it will be understood that any other suitable means may be employed for catching or receiving said cups.

When employing a device such as the tray 28 provided with holes for catching the falling cups, said tray or the like may be positioned at various distances below the cups 2 so long as the cups, in falling, are received in said holes. Of course, the arrangement shown in Figure 4 precludes the transfer of any more heat to the food 10 than is necessary to release the same from the plate 11, and this will be so slight as not to affect materially the solidity of the food material 10 in the cups 2.

Each cup 2, upon release from the plate 11, is formed in its upper surface 9 with a substantially perfect reproduction of the design of the plate 11, as shown by way of illustration in Figures 6 and 7, the lettering or design being formed by depressions 32.

The loaded tray 28 may be removed from the position shown in Figure 4 independently of the separated plate 11, or the two may be removed substantially together, as desired.

A modified construction affording a separation of the food cups from the name plate after the same has been removed from the hardening and refrigerating compartment, and affording also a disposal or collection of the cups thus separated, is illustrated in Figure 5. This construction embodies a compartment 32 which may be heated in any desired manner, the heating means appearing in Figure 5 being presented for illustrative purposes only as comprising a body of water 33 through which one or more steam pipes 34 pass. The compartment 32 is provided with an inclined wall 35 which is heated by the water 33. Adjacent the bottom 36 of the wall 35 is placed a strip 37 or other abutment means, and the plate 11 with the cups 2 adhering thereto is placed as shown in Figure 5 over the wall 35 and allowed to rest at its lower margin against the abutment 37, which serves to hold the plate 11 stationary on the wall 35. In accordance with this form of the invention, the plate 11 is formed on the side on which the cups 2 are disposed with abutment means 38 so positioned as to engage or substantially engage the lowermost portions of the rims 16 of the cups 2, for the purpose of preventing the cups from sliding down the plate 11.

The location of the center of gravity of each cup 2 determines the inclination of the wall 35, and with cups of different sizes and shapes, it will be understood that the inclination of the wall 35 will be made to correspond. In the illustrated embodiment of the invention, the cups 2 and contents are cone-shaped, and the center of gravity is accordingly located at a point substantially one-fourth up from the base or rim 16. It will be observed that the inclination of the wall 35 is accordingly such that a plumb line from the center of gravity of each cup 2 is located to the right, as is viewed in Figure 5, of the point of contact between the abutment 38 and the base or rim of the cup. This arrangement insures the instability of the cups 2 as soon as the heat transferred from the wall 35 to the plate 11 is sufficient to release the food material in the cup 2 from the plate 11. When the release becomes effective, the cups 2 and their contents topple over the abutments 38 and fall into a bin 39 provided for the purpose of receiving the cups. Each cup, upon its release from the name plate 11, is formed in its outer surface with a substantially exact reproduction of the design imparted thereto by said plate, and with the construction just described, defacing of the design or lettering in the food material during the course of separation of the cups from the plate 11 is prevented. Upon their release from the plate, the cups 2 are ready for shipment or sale to the ultimate consumer.

A modified form of name plate construction is shown in Figures 8 and 9, wherein the name plate device 11a comprises a sheet 40 which is preferably made of pasteboard, bond, parchment, pressed paper or the like, bearing the embossed design 41, and a cover plate 42 preferably of metal or the like. The plate 42 is provided with pins or legs 43 which are secured to the plate 42 and cooperate therewith in the same manner in which the pins 13 are secured to and cooperate with the plate 11. The paper or like sheet 40 is preferably formed of the same dimensions peripherally as the cover plate 42, the sheet 40 being provided with holes 44 arranged in corresponding relation to the pins 43 so that when the pins 43 project through said holes, the sheet 40 and plate 42 substantially coincide as shown in Figures 8 and 9.

In the employment of the printing device 11a the sheet 40 is placed under the plate 42 by passing the pins 43 through the holes 44 in the sheet 40. The plate and sheet are held together in substantially the relationship shown in Figure 9 and are then placed over the cups 2 with the pins 43 fitting in the holes 15 in the shelves 3 and 4 of the tray 1, so that a design 41 will be positioned over each cup 2 substantially as shown in Figure 8. This of course is done after the cups have been charged with the semi-liquid ice cream or the like 10. After this step, the same procedure involving the employment of the name plate 11 above described is followed in the use of the name plate construction 11a comprising the parts 40 and 42. When it is desired to effect a separation of the name plate construction 11a from the hardened food material in the cups after the same have been removed from the refrigerator, preferably both parts 40 and 42 are positioned so that they are supported by the strips 25 in the releasing apparatus shown in Figure 4 or by the abutment 37 in Figure 5.

Th part 40 is preferably made of paper material for purposes of economy and the part 42 is preferably of relatively heavy material such as metal in order to hold the sheet 40 flat against the rims 16 of the cups 2 and to afford a good conductor of heat. When a name plate construction, such as that designated 11, is employed, a change in the design or name requires discarding the plates with the discarded designs or names and the making up of new plates, and this may involve some expense. With the name plate construction shown in Figures 8 and 9, however, the material of the name plate sheets 40 being relatively inexpensive, discarding of sheets 40 having old designs for new sheets having new designs is a matter of relatively small expense, and the metal or the like cover plates 42 need not be changed but may be used with sheets 40 containing any design or lettering whatsoever.

It will be observed that in the employment of name plate constructions such as 11 and 11a, the design or lettering is formed in intaglio or as an engraving in the surface 9 of the food material 10. Obviously, the depressions in the designs 8 and 41 may constitute the portions adjacent the design or lettering, in which event the design or lettering would be formed in relief on the surface 9 of the material 10. Moreover, it will be understood that while, in the use of the name plates 11 and 11a the lettering preferably does not project beyond the plane of the rim 16 of the cups, the design could, if desired, be so impressed in the plates as to permit portions of the design to project above the rims 16 of the cups 2.

It may be desired to form the design or lettering in relief by the employment of a stencil device, and to this end, the name plate construction designated generally by reference character 11b is provided. The construction of the name plate device 11b is similar to that designated 11a, except that the paper or like sheet 45, instead of having the design embossed as in the paper or like sheet 40 in Figures 8 and 9, constitutes a stencil sheet with the lettering or design 46 formed by perforations as shown in Figures 10 and 11. Except for the fact that the design 46 in the sheet 45 is formed by perforations, the sheet 45 is in substantially all respects identical with the sheet 40, and cooperates with the metal or the like cover plate 42 and associated pins 43 in the same way in which the sheet 40 cooperates therewith. In the event the form of apparatus shown in Figure 5 is employed to effect a release of the cups 2 and contained food material 10 from the name plate, it is preferable that the lettering or design have its walls inclined sufficiently to permit the cups 2 to topple over the abutments 38 without interference from interlocking of the name plate and the design formed in the surface 9 of the food material 10, which might otherwise take place and result in a possible defacement of the design in the ice cream or the like.

It will be appreciated from the foregoing that the invention affords a simple method and apparatus for carrying out the method, whereby the identification desired may be readily formed in the outer surface of a cup or pack of ice cream or the like, and whereby the printing device and cups containing the hardened and frozen food material may be readily and neatly separated from one another automatically.

It will be observed that the embossed name plate constructions function substantially in the same way, and that this is true also of the name plate construction embodying the stenciled sheets. Moreover, the name plate constructions are preferably made of material of sufficient heat conductivity to insure rapid heat transfer to the adjacent frozen surface of the ice cream or other confection to afford a rapid diminution of the adhesion between the confection and the plate so that the two may be readily separated.

The cups 2 may be made of non-porous material such as waxed paper and the name plate instrumentalities are likewise sufficiently moisture-proof to discourage seepage or excessive absorption of the confection while in a semi-liquid condition.

The food material charged into the cups, being of a substantially plastic consistency, will be substantially precluded from leaking between the plate and the cups when the same are inverted. Moreover, when the cups of confection are inverted over the plate, prior to the freezing or hardening process, there exists a condition similar to that obtaining when a glass of water is inverted over a sheet of paper engaging the rim of the glass. That is, just as the vacuum inside of the glass and the pressure of the atmosphere on the free surface of the paper enable the paper to support the water, so do the vacuum produced in the cups when the same and its contents are inverted and the atmospheric pressure on the free surface of the inverted plate engaging the rim of the cup, cooperate with the plate to provide a substantially leak-proof seal between the plate and the cup.

I am aware that many changes may be made and numerous details of construction may be varied through a wide range without departing from the principles of this invention, and I therefor do not purpose limiting the patent granted hereon otherwise than is necessitated by the scope of the appended claims.

I claim as my invention:

1. The process of applying print in the surface of a frozen confection, comprising the steps of placing a charge of the confection while in a relatively plastic condition in a container, placing a cover with a printed mark formed therein over the confection, inverting the container to insure intimate contact between the mark and the confection, hardening the confection to a relatively rigid condition and removing the cover.

2. The process of preparing a package of ornamented frozen confection for the ultimate consumer, comprising the steps of placing a charge of semi-liquid confection in a container, covering the container with a member deformed into a design, with the design directly over the container, inverting the container and member so that the container and confection are supported by the member and the confection intimately contacts the deformity in the member, subjecting the container, confection and member to a subfreezing temperature for the confection until the latter is in a solid condition and is frozen to the container and member, re-inverting the unit thus formed and suspending the confection and container from the member, and heating the member to overcome the adhesion between the same and the confection so that the confection with the design of the deformed portion of the member formed in its surface gravitates free of the member.

3. In an apparatus for applying identification print to a confection, a tray having a plurality of sockets in a predetermined arrangement, confection-containing cups disposed in said sockets and having their rims in substantially the same plane, a name plate having a plurality of embossed designs in said predetermined arrangement, said plate and tray having means for positionng said plate in covering relation to the cups with a design over each cup, and said means being releasable and the engagement thereof with said tray being of such a nature that said tray may be removed with the apparatus in inverted position without disturbing said cups.

4. As an article of manufacture, in an apparatus for forming a design in the surface of a confection carried in a cup of predetermined height, a name plate for supporting the cup in inverted position, and means projecting from said plate to an extent greater than the height of the cup, said means being arranged to form a support for an identical superimposed plate whereby a plurality of plates bearing confection-containing cups may be stacked to minimize horizontal space occupied thereby.

5. In an apparatus for separating a heat-conducting name plate from a body of confection frozen thereto by liquefying the adhering surface of the confection, a source of heat, and means for supporting the plate in proximity to said source with the body of confection suspended from the plate so that when the heat transferred by the plate to the confection overcomes the adhesion between the same and the plate, the body of confection will gravitate from the plate.

6. In an apparatus for forming a design in a surface of a quantity of confection, a heat conducting name plate to which a body of confection is frozen so that the design of the plate is duplicated in the frozen surface of the confection, means for supporting the plate at an angle to the horizontal, the angle of inclination of said plate being such that the body is in unstable equilibrium except for its adhesion to the plate, abutments on said plate adjacent the design therein for engagement with the exterior of the body at the lower side thereof when the plate is so supported, and a source of heat for said plate, whereby, when the adhesion between the plate and the body is diminished by the heat to a point where it will not support the body, the latter will gravitate pivotally about the abutments.

7. In an apparatus for forming a design in a surface of frozen confection, wherein the confection is carried in a plurality of individual containers, name plate construction comprising a sheet of web-like material having a plurality of designs embossed therein, and of such construction as to be substantially moisture-proof, each of said designs being surrounded by a continuous portion of the material for engagement with the rim of the associated container, and a relatively heavy cover plate for overlying the sheet to hold the same against the cups.

8. The method of applying insignia to the surface of a confection, consisting of assembling a charge of the confection while in a relatively plastic condition in a container inverted over a plate having the insignia formed therein beneath the container, chilling the confection until the same adheres to the plate, mounting the plate in such a position that the container and confection are supported by the adhesion between the plate and confection, and heating the plate sufficiently to overcome said adhesion and allow the container and confection to gravitate free of the plate.

9. The method of applying insignia of a desired character to the surface of a confection, consisting of placing a charge of confection while in a relatively plastic condition in a container, placing a cover with desired insignia formed therein over said container, inverting said container and cover so said confection rests upon said insignia, chilling said confection to harden the same to a relatively stiff condition and form said insignia thereon, said confection adhering to said cover, altering the position of said cover until the confection and container are held in place by the adhesion between said confection and said cover, and heating said cover sufficiently to overcome said adhesion and allow said confection and container to gravitate free of said cover.

10. The method of applying insignia of a desired character to a confection, consisting of placing a mass of confection in a relatively plastic condition over a plate having suitable insignia thereon, chilling said confection to harden the same to a relatively rigid condition and form the surface of the confection in accord with said insignia, said confection adhering to said plate, altering the position of said plate until said confection retains its position only by the adhesion between it and said plate, and heating said plate sufficiently to overcome said adhesion and allow said confection to gravitate free of said plate.

11. The method of applying insignia of a desired character to a confection consisting of placing a charge of confection in a container having an open portion, placing a plate carrying insignia over said open portion, changing the position of said container and said plate until said confection intimately contacts said insignia through said open portion, chilling said confection until the same hardens to a relatively rigid condition and adheres both to said container and to said plate, placing said plate in a position of such inclination that said container and said confection are held in position only by the adhesion between the confection and plate, and heating said plate sufficiently to overcome said adhesion and allow the said container and confection to slide off said plate.

12. Apparatus for applying insignia of a desired character to a confection, comprising in combination a support for holding a container of confection, a plate bearing suitable insignia to overlie said container, said plate being adapted to support said container in inverted position with said confection resting upon said insignia, means loosely connecting said plate and said support and being of such a character that said support may be removed without disturbing said container when the latter is inverted, supporting means designed to hold said plate in such position that said confection and said container are retained in place against the action of gravity only by the adhesion between said confection and said plate, and heating means for heating said plate to overcome said adhesion.

13. Apparatus for applying insignia of a desired character to a confection, comprising in combination a plate having insignia of the desired character and adapted to support a container of confection in inverted position over said insignia in such a manner that said confection upon hardenng will adhere to said plate, supporting means for holding said plate in such a position that said container and said confection are retained in position only by the adhesion between said confection and said plate, and heating means for raising the temperature of said plate sufficiently to overcome said adhesion.

14. Apparatus for applying insignia of a desired character to the exposed surface of a confection in an open-ended container, a rack for receiving such container with confection therein in a plastic state, a member having suitable insignia thereon for disposition over said rack and container with said insignia over the open end of said container so that when said confection is relatively solidified it will adhere to said member, supporting means to hold said member in such a position that said container and said confection are in unstable equilibrium except for the adhesion between said confection and said member, and heating means for raising the temperature of said member sufficiently to overcome said adhesion.

15. In apparatus for applying insignia of a desired character to a confection, a heat conducting plate carrying suitable insignia over which a body of confection may be hardened until adhesion between the plate and confection results, a support for said plate designed to hold the plate in such a position that said confection is retained in position only by said adhesion, and a source of heat adjacent said support to raise the temperature of said plate sufficiently to overcome said adhesion.

FREDERICK THOMAS KREIN.